US011236263B2

(12) United States Patent
Singh et al.

(10) Patent No.: US 11,236,263 B2
(45) Date of Patent: Feb. 1, 2022

(54) METHOD OF SAND CONSOLIDATION IN PETROLEUM RESERVOIRS

(71) Applicant: Saudi Arabian Oil Company, Dhahran (SA)

(72) Inventors: Pratyush Singh, Dhahran (SA); Abdullah Al-Yami, Dhahran (SA); Vikrant Wagle, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/826,989

(22) Filed: Mar. 23, 2020

(65) Prior Publication Data

US 2021/0261851 A1 Aug. 26, 2021

Related U.S. Application Data

(60) Provisional application No. 62/981,786, filed on Feb. 26, 2020.

(51) Int. Cl.
*E21B 43/02* (2006.01)
*C09K 8/575* (2006.01)

(52) U.S. Cl.
CPC .......... *C09K 8/5755* (2013.01); *E21B 43/025* (2013.01)

(58) Field of Classification Search
None
See application file for complete search history.

(56) References Cited

U.S. PATENT DOCUMENTS

| | | | |
|---|---|---|---|
| 602,375 A | 4/1898 | Suydam | |
| 3,250,330 A | 5/1966 | Smith, Jr. | |
| 3,476,189 A | 11/1969 | Bezemer et al. | |
| 3,565,176 A | 2/1971 | Wittenwyler | |
| 3,646,999 A | 3/1972 | Hamby, Jr. et al. | |
| 3,915,232 A | 10/1975 | Gruesbeck | |
| 4,003,873 A | 1/1977 | Smith | |
| 4,042,032 A | 8/1977 | Anderson et al. | |
| 4,072,194 A | 2/1978 | Cole et al. | |
| 4,199,484 A | 4/1980 | Murphey | |
| 4,247,430 A | 1/1981 | Constien | |
| 4,665,988 A | 5/1987 | Murphey et al. | |
| 4,730,675 A | 3/1988 | Wygant et al. | |
| 4,749,042 A | 6/1988 | Wu | |
| 4,799,553 A | 1/1989 | Wu | |
| 5,178,218 A | 1/1993 | Dees | |
| 5,712,314 A | 1/1998 | Surles et al. | |
| 5,770,657 A | 6/1998 | Chou et al. | |
| 5,873,413 A | 2/1999 | Chatterji et al. | |
| 5,875,844 A | 3/1999 | Chatterji et al. | |
| 5,875,845 A | 3/1999 | Chatterji et al. | |
| 5,911,282 A | 6/1999 | Onan et al. | |
| 5,959,061 A | 9/1999 | Neumann et al. | |
| 6,016,870 A | 1/2000 | Dewprashad et al. | |
| 6,124,246 A | 9/2000 | Heathman et al. | |
| 6,196,316 B1 | 3/2001 | Bosma et al. | |
| 6,234,251 B1 | 5/2001 | Chatterji et al. | |
| 6,271,181 B1 | 8/2001 | Chatterji et al. | |
| 6,316,529 B1 | 11/2001 | Temme et al. | |
| 6,321,841 B1 | 11/2001 | Eoff et al. | |
| 6,328,106 B1 | 12/2001 | Griffith et al. | |
| 6,448,206 B1 | 9/2002 | Griffith et al. | |
| 6,450,260 B1 | 9/2002 | James et al. | |
| 6,478,088 B1 | 11/2002 | Hansen et al. | |
| 6,802,375 B2 | 10/2004 | Bosma et al. | |
| 6,837,316 B2 | 1/2005 | Reddy et al. | |
| 6,880,642 B1 | 4/2005 | Garrett et al. | |
| 7,673,686 B2 | 3/2010 | Nguyen et al. | |
| 7,762,329 B1 | 7/2010 | Morgan et al. | |
| 7,926,591 B2 | 4/2011 | Nguyen et al. | |
| 7,956,017 B2 | 6/2011 | Gatlin et al. | |
| 7,975,764 B2 | 7/2011 | Sullivan et al. | |
| 8,157,009 B2 | 4/2012 | Patil et al. | |
| 8,235,116 B1 | 8/2012 | Burts, Jr. et al. | |
| 8,273,426 B1 | 9/2012 | Laramay et al. | |
| 8,307,899 B2 | 11/2012 | Brenneis et al. | |
| 8,664,285 B2 | 3/2014 | Birnbrich et al. | |
| 8,789,595 B2 | 7/2014 | Guerrero et al. | |
| 8,857,515 B2 | 10/2014 | Weaver | |

(Continued)

FOREIGN PATENT DOCUMENTS

| | | |
|---|---|---|
| CA | 2709646 A1 | 7/2009 |
| CN | 101451061 A | 6/2009 |

(Continued)

OTHER PUBLICATIONS

Office Action dated May 8, 2020 pertaining to U.S. Appl. No. 16/515,673, filed Jul. 18, 2019, 41 pgs.
Office Action dated Oct. 6, 2020 pertaining to U.S. Appl. No. 16/809,892, filed Mar. 5, 2020, 44 pgs.
Office Action dated Oct. 6, 2020 pertaining to U.S. Appl. No. 16/809,822, filed Mar. 5, 2020, 44 pgs.
Examination Report dated May 6, 2020 pertaining to GCC Patent Application No. 2019/37457.
Examination Report dated Aug. 31, 2020 pertaining to GCC Patent Application No. 2019/37457.
Notice of Allowance and Fee(s) Due dated Dec. 10, 2020 pertaining to U.S. Appl. No. 16/809,892, filed Mar. 5, 2020, 14 pgs.

(Continued)

*Primary Examiner* — Andrew Sue-Ako
(74) *Attorney, Agent, or Firm* — Dinsmore & Shohl LLP

(57) ABSTRACT

In accordance with one or more embodiments of the present disclosure, a method of consolidating sands in a subterranean formation penetrated by a wellbore may comprise contacting sand particles in the subterranean formation with a treatment fluid to form coated sands; where the treatment fluid comprises a multicomponent epoxy, a base fluid, and an amine hardening agent, the multicomponent epoxy comprising a diglycidyl ether resin and a monoglycidyl ether resin. The method further allowing the amine hardening agent to cure the multicomponent epoxy and form the consolidated sands.

20 Claims, No Drawings

(56) References Cited

U.S. PATENT DOCUMENTS

| | | | |
|---|---|---|---|
| 8,936,087 B2 | 1/2015 | Nguyen et al. | |
| 8,944,164 B2 | 2/2015 | Veldman et al. | |
| 8,946,130 B2 | 2/2015 | Zamora et al. | |
| 9,150,775 B2 | 10/2015 | Ostvold | |
| 9,321,953 B1 | 4/2016 | Ferrell, Jr. et al. | |
| 9,410,066 B2 | 8/2016 | Ghassemzadeh | |
| 9,701,885 B2 | 7/2017 | Husein et al. | |
| 9,828,293 B2 | 11/2017 | Yadav et al. | |
| 9,902,891 B2 | 2/2018 | Hundt et al. | |
| 9,932,510 B2 | 4/2018 | Walker et al. | |
| 10,005,930 B2 | 6/2018 | Reddy | |
| 10,081,755 B2 | 9/2018 | Ballard | |
| 10,138,405 B2 | 11/2018 | Kulkarni et al. | |
| 10,144,858 B2 | 12/2018 | Kennedy et al. | |
| 2001/0035111 A1 | 11/2001 | Gienau et al. | |
| 2002/0020530 A1 | 2/2002 | Griffith et al. | |
| 2006/0219405 A1 | 10/2006 | Nguyen et al. | |
| 2007/0093393 A1 | 4/2007 | Navarrete et al. | |
| 2007/0102156 A1* | 5/2007 | Nguyen | E21B 43/025 166/280.2 |
| 2008/0110624 A1 | 5/2008 | Nguyen et al. | |
| 2008/0277117 A1 | 11/2008 | Burts, Jr. et al. | |
| 2010/0326660 A1 | 12/2010 | Ballard et al. | |
| 2011/0088916 A1 | 4/2011 | Heijnen | |
| 2011/0203795 A1 | 8/2011 | Murphy et al. | |
| 2011/0284247 A1 | 11/2011 | Zamora et al. | |
| 2011/0308799 A1 | 12/2011 | Tarafdar et al. | |
| 2012/0328377 A1 | 12/2012 | Brenneis et al. | |
| 2013/0008654 A1 | 1/2013 | Deville et al. | |
| 2013/0105162 A1 | 5/2013 | Abad et al. | |
| 2013/0178590 A1 | 7/2013 | Jin et al. | |
| 2013/0292116 A1 | 11/2013 | Nguyen et al. | |
| 2014/0027116 A1 | 1/2014 | Suresh et al. | |
| 2014/0076563 A1 | 3/2014 | Lin et al. | |
| 2014/0083702 A1 | 3/2014 | Godfrey et al. | |
| 2014/0367105 A1 | 12/2014 | Karcher et al. | |
| 2015/0152708 A1 | 6/2015 | Smith | |
| 2015/0167424 A1 | 6/2015 | Richards et al. | |
| 2016/0046853 A1 | 2/2016 | Chatterji et al. | |
| 2016/0194544 A1 | 7/2016 | Jones et al. | |
| 2016/0194548 A1* | 7/2016 | Xie | E21B 43/025 166/305.1 |
| 2016/0208157 A1 | 7/2016 | Vo et al. | |
| 2016/0272875 A1 | 9/2016 | Ghumare et al. | |
| 2016/0362599 A1 | 12/2016 | Wadekar et al. | |
| 2017/0009122 A1 | 1/2017 | Funkhouser et al. | |
| 2017/0130554 A1 | 5/2017 | Jones et al. | |
| 2017/0137562 A1 | 5/2017 | Zheng et al. | |
| 2017/0247607 A1 | 8/2017 | Hundt | |
| 2017/0349804 A1 | 12/2017 | Kellum et al. | |
| 2017/0350212 A1 | 12/2017 | Sabins et al. | |
| 2018/0066489 A1 | 3/2018 | Pipchuk et al. | |
| 2018/0216437 A1 | 8/2018 | Shafer | |
| 2018/0346801 A1* | 12/2018 | Dandawate | E21B 43/025 |
| 2019/0249067 A1 | 8/2019 | Wagle et al. | |
| 2020/0024503 A1 | 1/2020 | Watters et al. | |

FOREIGN PATENT DOCUMENTS

| | | |
|---|---|---|
| EP | 898049 A1 | 2/1999 |
| EP | 898050 A1 | 2/1999 |
| EP | 899415 A1 | 3/1999 |
| EP | 899416 A1 | 3/1999 |
| EP | 903461 A1 | 3/1999 |
| EP | 1031544 A2 | 8/2000 |
| EP | 2166028 A1 | 3/2010 |
| WO | 2014036218 A1 | 3/2014 |
| WO | 2014074112 A1 | 5/2014 |
| WO | 2014197827 A1 | 12/2014 |
| WO | 2014200889 A1 | 12/2014 |
| WO | 2015023186 A1 | 2/2015 |
| WO | 2015040241 A1 | 3/2015 |
| WO | 2016043979 A1 | 3/2016 |
| WO | 2016048303 A1 | 3/2016 |
| WO | 2016048332 A1 | 3/2016 |
| WO | 2016080974 A1 | 5/2016 |
| WO | 2016093827 A1 | 6/2016 |
| WO | 2016111674 A1 | 7/2016 |
| WO | 2017204812 A1 | 11/2017 |
| WO | 2019091900 A1 | 5/2019 |

OTHER PUBLICATIONS

International Search Report and Written Opinion dated Dec. 11, 2020 pertaining to International application No. PCT/US2020/050616 filed Sep. 14, 2020, 13 pgs.

Notice of Allowance and Fee(s) Due dated Dec. 30, 2020 pertaining to U.S. Appl. No. 16/809,822, filed Mar. 5, 2020, 13 pgs.

Bhaisora et al., "Innovative Application of Ultra-Lightweight Epoxy Resin-Cement Slurry Mixture Achieved Zonal Isolation Objectives and Secured Well Integrity: Case History From Offshore Gulf of Suez", IPTC-18504-MS, 2015.

Foianini et al., "Successful Identification and Bond Assessment of Epoxy-Based Resin Cement Behind Production Casing: Integrating Cementing Technology with New Log Interpretation Methodology To Provide an Innovative Well Integrity Solution", SPWLA 55th Annual Logging Symposium, May 18-22, 2014.

Moe et al., "Anular pressure buildup: What it is and what to do about it", World Oil Deepwater Technology Supplement, Issue, p. 21-23, Aug. 2000.

Morris et al., "Resin-Based Cement Alternatives for Deepwater Well Construction", Society of Petroleum Engineers, SPE-155613-MS, 2012.

Nelson et al., "Well Cementing Fundamentals", Oilfield Review Summer, vol. 24, No. 2, pp. 59-60, 2012.

International Search Report and Written Opinion dated Mar. 15, 2019 pertaining to International application No. PCT/US2018/060282 filed Nov. 12, 2018, 13 pgs.

International Search Report and Written Opinion dated Jun. 21, 2019 pertaining to International application No. PCT/US2019/026882 filed Apr. 11, 2019, 14 pgs.

Office Action dated Sep. 17, 2019 pertaining to U.S. Appl. No. 16/117,902, filed Aug. 30, 2018, 26 pgs.

Office Action dated Sep. 30, 2019 pertaining to U.S. Appl. No. 16/117,974, filed Aug. 30, 2018, 35 pgs.

Office Action dated Nov. 13, 2019 pertaining to U.S. Appl. No. 16/515,673, filed Jul. 18, 2019, 23 pgs.

Office Action dated Nov. 18, 2019 pertaining to U.S. Appl. No. 16/117,950, filed Aug. 30, 2018, 22 pgs.

Cestari, A. R. et al., "Synthesis, characterization and hydration analysis of a novel epoxy/superplasticizer oilwell cement slurry Some mechanistic features by solution microcalorimetry" Journal of Colloid and Interface Science, Apr. 27, 2012, pp. 359-368, vol. 392.

Elyas, O. et al. "Use of Polymer Resins for Surface Annulus Isolation Enhancement" SPE-192266-MS, Society of Petroleum Engineers, Apr. 26, 2018, pp. 1-8.

Al-Yami, A. et al. "Optimum Practices to Mitigate Gas Migration Problems in Deep Gas Wells" SPE-187700-MS, Society of Petroleum Engineers, Oct. 18, 2017, pp. 1-21.

Alsaihati, Z. A. et al. "An Overview of Polymer Resin Systems Deployed for Remedial Operations in Saudi Arabia" SPE-188122-MS, Society of Petroleum Engineers, Apr. 27, 2017, pp. 1-15.

International Search Report and Written Opinion dated Nov. 7, 2019 pertaining to International application No. PCT/US2019/047846 filed Aug. 23, 2019.

International Search Report and Written Opinion dated Nov. 7, 2019 pertaining to International application No. PCT/US2019/047842 filed Aug. 23, 2019.

Final Rejection pertaining to U.S. Appl. No. 16/117,902 dated Jan. 17, 2020.

Office Action dated Mar. 10, 2020 pertaining to U.S. Appl. No. 16/117,974, filed Aug. 30, 2018, 39 pgs.

Notice of Allowance and Fee(s) Due dated Mar. 12, 2020 pertaining to U.S. Appl. No. 16/117,950, filed Aug. 30, 2018, 16 pgs.

(56) References Cited

OTHER PUBLICATIONS

Office Action dated Nov. 17, 2020 pertaining to U.S. Appl. No. 16/117,974, filed Aug. 30, 2018, 46 pgs.
Office Action dated Jun. 24, 2020 pertaining to U.S. Appl. No. 16/117,974, filed Aug. 30, 2018, 41 pgs.
International Search Report and Written Opinion dated Jul. 23, 2020 pertaining to International application No. PCT/US2020/028050 filed Apr. 14, 2020, 15 pgs.
International Search Report and Written Opinion dated Jul. 23, 2020 pertaining to International application No. PCT/US2020/028082 filed Apr. 14, 2020, 15 pgs.
Office Action dated Jan. 28, 2021 pertaining to U.S. Appl. No. 16/829,470, filed Mar. 25, 2020, 51 pgs.
Office Action dated Feb. 18, 2021 pertaining to U.S. Appl. No. 16/718,716, filed Dec. 18, 2019, 66 pgs.
Office Action dated Mar. 11, 2021 pertaining to U.S. Appl. No. 16/117,974, filed Aug. 30, 2018, 43 pgs.
Office Action dated May 7, 2021 pertaining to U.S. Appl. No. 16/117,902, filed Aug. 30, 2018, 76 pages.
Office Action dated May 25, 2021 pertaining to U.S. Appl. No. 16/829,470, filed Mar. 25, 2020, 25 pages.
International Search Report and Written Opinion dated Jun. 1, 2021 pertaining to International application No. PCT/US2021/018660 filed Feb. 19, 2021, 14 pages.
U.S. Office Action dated Jul. 23, 2021 pertaining to U.S. Appl. No. 16/718,716, filed Dec. 18, 2019, 28 pages.
Notice of Allowance and Fee(s) Due dated Aug. 12, 2021 pertaining to U.S. Appl. No. 16/117,974 filed Aug. 30, 2018, 14 pages.
Notice of Allowance and Fee(s) Due dated Aug. 5, 2021 pertaining to U.S. Appl. No. 16/829,470 filed Mar. 25, 2020, 12 pages.

\* cited by examiner

METHOD OF SAND CONSOLIDATION IN PETROLEUM RESERVOIRS

CROSS-REFERENCE TO RELATED APPLICATIONS

This application claims the benefit of U.S. Provisional Application Ser. No. 62/981,786 filed Feb. 26, 2020, the entire disclosure of which is hereby incorporated herein by reference.

BACKGROUND

Field

The present disclosure relates to wellbore drilling technology and, more specifically, to methods of sand consolidation utilized in wellbore drilling.

Background

Drilling operations to drill wellbores for hydrocarbon extraction often encounter issues caused by the intrusion of sand and other fine particles into the wellbore. This influx of sand can cause problems, such as erosion of valves and pipelines, plugging of the production casing and liner, and deposition in and plugging of separators, leading to production limitations up to and including abandonment of the well.

Generally, the process of chemical sand consolidation includes forcing a treatment fluid through the well casing and causing it to accumulate in the sand production area. After setting, the treatment fluid forms an artificial borehole wall. The artificial borehole wall prevents the reservoir from producing sand or restricts the flow of sand into the well. Present treatment fluids used for sand consolidation have either insufficient compressive strength or undesirable rheological characteristics.

BRIEF SUMMARY

Thus, new treatment fluids, which may provide faster and more efficient sand consolidation techniques, are desired. These treatment fluids can be pumped in a liquid state and converted to a solid as desired. The treatment fluids may be suitable to coat and anchor sands within a geological feature.

In accordance with one or more embodiments of the present disclosure, a method of consolidating sands in a subterranean formation penetrated by a wellbore is provided. The method comprises contacting sand particles in the subterranean formation with a treatment fluid to form coated sands; where the treatment fluid comprises a multicomponent epoxy, a base fluid, and an amine hardening agent, the multicomponent epoxy comprising a diglycidyl ether resin and a monoglycidyl ether resin. The method further allowing the amine hardening agent to cure the multicomponent epoxy and form the consolidated sands.

ABBREVIATIONS

One or more abbreviations are used in the present application, in which:
API=American Petroleum Institute
ASTM=American Society for Testing and Materials;
C12-C14=group containing between 12 and 14 carbon atoms
cP=centipoises
° C.=degrees Celsius
° F.=degrees Fahrenheit
ft=feet
hrs.=hours
mm=millimeters
RPM=revolutions per minute
SOBMs=synthetic oil based muds
SRT=step rate test
wt. %=weight percent

DETAILED DESCRIPTION

The present disclosure is directed to chemical sand consolidation methods that may be suitable for use in natural resource extraction wells. The disclosed methods may be especially suitable for use in natural resource extraction wells characterized as low-injectivity heterogeneous, or long-interval. A heterogeneous reservoir is one in which reservoir properties, such as porosity and permeability, are randomly distributed from place to place. A long-interval well refers to one in which the well is perforated at intervals of greater than 15 ft apart.

As used throughout this disclosure, "sand particles" may constitute a formation of loose sands. As used in the present disclosure, "sands" refers to small formation particles also known as "fines," which may be produced with the reservoir fluid. In some cases, individual sand particles may be detrital grains with a particle diameter ranging from 0.0625 millimeters (mm) to 2 mm in diameter.

As used throughout this disclosure, the term "low-injectivity zones" refers to zones in which it is not possible to inject materials containing solid particles. Low-injectivity zones may include zones having an injectivity factor of greater than 4000 pounds of force per square inch·min per barrel (psi-min/bbl), or even greater than 6000 psi-min/bbl. As used throughout this disclosure, the term "barrel" refers to a unit of measure equal to 42 U.S. Gallons. The injectivity factor is defined as the quotient of the injection pressure in pounds of force per square inch (psi) divided by the injection rate in barrels per minute (bbl/min). These low-injectivity zones may include, but are not limited to, tight fractures comprising very narrow microcracks from the wellbore into the subterranean formation and areas in which the annular distance between casings is tight. In low-injectivity zones, the average width of the microcracks in the formation or the annular distance between casings may be less than 100 microns, such as less than 50 microns, or even less than 10 microns. In these low-injectivity zones, solids particles in material compositions, such as conventional cement compositions, may cause blockage and prevent the cement or from being injected into the zone. For example, cement compositions and other conventional materials for remediating lost circulation zones include concentrations of solids not generally injectable into low-injectivity zones. Low-injectivity zones require the use of materials that are substantially free of solids or solid particles. As used in this disclosure, the term "substantially free" of a constituent means less than 1 weight percent (wt. %) of that component in a particular portion of a composition, such as a drilling fluid, sealing composition, lost circulation material, spacer fluid, or cleaning fluid. As an example, a lost circulation material that is substantially free of solids may have less than 1 wt. % solids based on the total weight of the lost circulation material.

Generally, chemical sand consolidation techniques can be divided into phase separation systems and overflush systems. Generally, when compared to overflush systems, phase separation systems may contain a relatively smaller (15 wt. % to 25 wt. 0/0) amount of active resin in an otherwise inert solution. The resin may be preferentially attracted to the sand grains, which leaves the inert material to temporarily block or otherwise hold open the pore spaces.

According to some embodiments, the subterranean formation contains less than or equal to 10 wt. % clay. Generally, phase separation systems will have reduced effectiveness in formations that contain more than 10 wt. % clays. Without being limited by theory, this is believed to be due to competition between the clay and the sand for the resin. However, as clays tend to have relatively greater surface area in comparison to sands, the clays may attract more resin relative to the sands. Thus, there may be insufficient resin left to consolidate the remaining sand.

According to some embodiments, the method of consolidating sands in a subterranean formation penetrated by a wellbore comprises contacting sand particles in the subterranean formation with a treatment fluid to form coated sands. The treatment fluid comprises a multicomponent epoxy, a base fluid, and an amine hardening agent. The multicomponent epoxy comprises a diglycidyl ether resin and a monoglycidyl ether resin. The method further comprises allowing the amine hardening agent to cure the multicomponent epoxy and form the consolidated sands.

According to some embodiments, the treatment fluid may include from 5-99 weight percent (wt. %) of the multicomponent epoxy when compared with the total weight of the treatment fluid. For example, the treatment fluid may include from 5 to 80 wt. %, 5 to 65 wt. %, 5 to 50 wt. %, 5 to 40 wt. %, 10 to 95 wt. %, 15 to 95 wt. %, 15 to 80 wt. %, 10 to 80 wt. %, 15 to 65 wt. %, 15 to 40 wt. %, or any combination thereof, of the multicomponent epoxy.

According to some embodiments, the treatment fluid may include from 5 to 25 weight percent (wt. %) of the multicomponent epoxy when compared with the total weight of the treatment fluid. Generally, such treatment fluids may be part of a system referred to as a phase separation system. For example, the treatment fluid may include from 5 to 20 wt. %, 10 to 25 wt. %, 5 to 15 wt. %, 15 to 25 wt. %, or 20 to 25 wt. %, or any combination thereof, of the multicomponent epoxy.

According to further embodiments, the treatment fluid may include from 26-99 weight percent (wt. %) of the multicomponent epoxy when compared with the total weight of the treatment fluid. Generally, such treatment fluids may be part of a system referred to as an overflush system and intended for use in conjunction with an overflush fluid. For example, the treatment fluid may include from 30 to 95 wt. %, 40 to 95 wt. %, 50 to 95 wt. %, 60 to 95 wt. %, 70 to 95 wt. %, 80 to 95 wt. %, 30 to 80 wt. %, 30 to 70 wt. %, 40 to 70 wt. %, 30 to 60 wt. %, or any combination thereof, of the multicomponent epoxy.

According to some embodiments, the multicomponent epoxy includes a diglycidyl ether resin and a monoglycidyl ether resin. A diglycidyl ether resin is a resin in which the molecules have two epoxide groups, each attached to the central molecule by an ether. A monoglycidyl ether resin is a resin in which the molecules have one epoxide group attached to the central molecule by an ether. Without being limited to theory, the combination of the diglycidyl and monoglycidyl ether resins is believed to yield a controlled rheology which allows pumping of resin in areas with low injectivity.

According to some embodiments, the diglycidyl ether resin may include a Bisphenol-A diglycidyl ether or a 1,6-hexanediol diglycidyl ether. Without being bound by theory, diglycidyl ether resins with aromatic moieties, such as those disclosed presently, may give better crosslinking in comparison with resins which include a cyclohexanedimethanol group. This is because the benzene ring imparts a planar structure to the molecule while the cyclohexane group has a chair-like structure. The chair-like structure can lead to steric hindrance and hence decreased crosslinking.

According to some embodiments, the monoglycidyl ether may include a C12-C14 alkyl glycidyl ether resin. According to further embodiments, the monoglycidyl ether resin includes 2,3-epoxypropyl-o-tolyl ether. Generally, a C12-C14 alkyl glycidyl ether resin is preferable to a monoglycidyl ether with a 4 carbon alkyl (butyl) chain due to operational safety concerns. Specifically, the C12-C14 resin has a flash point of 113° C., while the C4 resin has a flash point of 54° C.

According to other embodiments, the weight ratio of diglycidyl ether resin:monoglycidyl ether resin in the multicomponent epoxy may be from 1:100 to 99:1. By varying the weight ratios of the diglycidyl ether resin:monoglycidyl ether resin, the rheological properties of the resulting multicomponent epoxy may be optimized for particular downhole conditions. For example, The ratio of diglycidyl ether resin:monoglycidyl ether resin in the multicomponent epoxy may be from 1.5:100 to 99:1, from 10:100 to 99:1, from 20:100 to 99:1, from 50:100 to 99:1, from 100:100 to 99:1, from 1000:100 to 99:1, from 1500:100 to 99:1, from 2000:100 to 99:1, from 3000:100 to 99:1, from 4000:100 to 99:1, from 5000:100 to 99:1, from 1000:100 to 8000:100, from 2000:100 to 8000:100, from 3000:100 to 8000:100, from 5000:100 to 8000:100, from 100:100 to 7000:100, from 1000:100 to 7000:100, from 2000:100 to 7000:100, from 3000:100 to 7000:100, from 5000:100 to 7000:100, or any combination thereof.

According to some embodiments, the treatment fluid may have an apparent viscosity at 300 RPM and 25° C. of from 1 to 500 cP. As drilling fluids are often viscoelastic and viscosity depends on stress, it is best to use the apparent viscosity at a specific shear stress. For example, the treatment fluid may have an apparent viscosity at 300 RPM and 25° C. of from 1 to 500 cP, from 50 to 400 cP, from 75 to 300 cP, from 75 to 200 cP, from 100 to 200 cP, from 125 to 175 cP, or any combination thereof. According to further embodiments, the treatment fluid may have an apparent viscosity at 100 RPM and 25° C. of from 1 to 500 cP, from 50 to 400 cP, from 75 to 300 cP, from 75 to 200 cP, from 75 to 150 cP, from 75 to 100 cP, from 100 to 200 cP, from 125 to 175 cP, from 25 to 75 cP, or any combination thereof. According to some embodiments or the present disclosure, the treatment fluid may have an apparent viscosity at 3 RPM and 25° C. of from 0.1 to 500 cP, from 0.1 to 400 cP, from 0.1 to 300 cP, from 0.1 to 200 cP, from 0.1 to 100 cP, from 0.1 to 50 cP, from 0.1 to 25 cP, from 0.1 to 5 cP, from 0.1 to 3 cP, from 1 to 3 cP, or any combination thereof. Apparent viscosity may be measured according to API "RP 13B-1: Recommended Practice for Field Testing Water-based Drilling Fluids."

The treatment fluid density may depend upon the specific base fluid chosen, the concentration of the multicomponent epoxy, and the presence of weighting or lesser density agents. For example, the weighting agents may include calcium bromide, barite, hematite, calcium carbonate, siderite, and limenite. For example, the lightening agent may include glass microspheres, thermoplastic microspheres, ceramic microspheres, hollow microspheres, ash, or any other particle with a density lesser than the density of the treatment fluid.

The treatment fluid may have a specific gravity of from 0.1 to 1000, from 0.1 to 500, from 0.1 to 50, from 0.1 to 25, from 0.1 to 5, from 0.1 to 3, from 0.5 to 3, from 1 to 3, from 0.1 to 2, from 0.5 to 2, from 1 to 2, from 0.75 to 1.5, or any combination thereof.

The treatment fluid may have a pH of from 1 to 14. The pH of the treatment fluid may play a role in determining hardening time for the epoxy components of the treatment fluid. In some cases, an inappropriate pH treatment fluid may cause the epoxy components to harden too early or may prevent the epoxy components from hardening at all. For example, the treatment fluid may have a pH from 1 to 12, from 1 to 10, from 1 to 8, from 1 to 6, from 1 to 4, from 2 to 14, from 2 to 12, from 2 to 10, from 2 to 8, from 2 to 6, from 2 to 4, from 4 to 14, from 4 to 12, from 4 to 10, from 4 to 8, from 4 to 6, from 6 to 14, from 6 to 12, from 6 to 8, from 8 to 14, from 8 to 12, from 10 to 14, or any combination thereof.

According to some embodiments, the weight ratio of multicomponent epoxy:amine hardening agent may be from 4:1 to 99:1, from 4:1 to 90:1, from 4:1 to 70:1, from 4:1 to 50:1, from 4:1 to 30:1, from 4:1 to 10:1, from 8:1 to 99:1, from 8:1 to 70:1, from 8:1 to 50:1, from 8:1 to 30:1, from 8:1 to 10:1, or any combination thereof. The ratio of multicomponent epoxy:amine hardening agent controls the cure time and should be adjusted to achieve the desired cure time.

According to some embodiments, the treatment fluid includes less than 5, less than 4, less than 3, less than 2, less than 1 wt. %, or even less than 0.01 wt. % of an aromatic curing agent. Amine hardening agents may be preferable aromatic curing agents as aromatic curing agents are frequently carcinogenic.

According to some embodiments, the amine hardening agent be non-aromatic. For example, the non-aromatic amine hardening agent may include diethylenetriamine (DETA), triethylenetetramine (TETA), tetraethylenepentamine (TEPA), or a combination of these.

According to some embodiments, the treatment fluid may further include a supporting agent. A supporting agent may include rigid grains such as quartz sand or walnut hull. Without being limited by theory, it is believed that the supporting agent may help to hold pores in the sand open. The supporting agent may be from 1 to 99 wt. %, from 5 to 90 wt. %, from 10 to 90 wt. %, from 20 to 90 wt. % from 30 to 90 wt. %, from 1 to 80 wt. %, from 1 to 60 wt. %, from 1 to 40 wt. %, from 1 to 20 wt. %, or from 1 to 10 wt. % of the treatment fluid.

According to some embodiments, the treatment fluid may further include a pore retaining agent. The pore retaining agent may include a light oil, which means an oil having an American Petroleum Institute (API) gravity more than 40°. The pore retaining agent may be from 1 to 99 wt. %, from 5 to 90 wt. %, from 10 to 90 wt. %, from 20 to 90 wt. % from 30 to 90 wt. %, from 1 to 80 wt. %, from 1 to 60 wt. %, from 1 to 40 wt. %, from 1 to 20 wt. %, or from 1 to 10 wt. % of the treatment fluid.

In one or more embodiments, the base fluid may include an aqueous solution. For example, the aqueous solution may include one or more of deionized, tap, distilled, or fresh waters; natural, brackish, or saturated salt waters; natural, salt dome, hydrocarbon formation produced, or synthetic brines; filtered or untreated seawaters; mineral waters; or other potable or non-potable waters containing one or more dissolved salts, minerals, or organic materials. In one or more embodiments, the base fluid may include at least 80 wt. %, at least 90 wt. %, at least 95 wt. %, at least 99 wt. %, or even at least 99.9 wt. % of water.

According to additional embodiments, the base fluid may include a non-aqueous solution. The non-aqueous solution may include one or more crude oils or crude oil derivatives such as gasoline, diesel, kerosene, bunker fuel, jet fuel, naptha, or any fraction of a crude oil. For example, in some embodiments non-aqueous drilling fluids may be referred to as synthetic oil based muds (also referred to in the present disclosure as oil-based muds and SOBMs). Synthetic oil-based muds may include crude oil derivatives that have been chemically treated, altered, or refined to enhance certain chemical or physical properties. In comparison, partially-refined crude oil, which may contain several classes (for example, alkane, aromatic, sulfur-bearing, nitrogen-bearing) of thousands of individual compounds, a SOBM may include one class with only tens of individual compounds (for example, ester compounds in a $C_{8-14}$ range). Examples of materials used as base fluids for SOBMs include linear alpha olefins, isomerized olefins, poly alpha olefins, linear alkyl benzenes, and vegetable and hydrocarbon-derived ester compounds. In one or more embodiments, the base fluid may include at least 80 wt. %, at least 90 wt. %, at least 95 wt. %, at least 99 wt. %, or even at least 99.9 wt. % of a non-water material such as an oil.

According to some embodiments, the treatment fluid penetrates at least 1 foot (ft) outside the wellbore into the formation. For example, at least 20 wt. % of the treatment fluid penetrates at least 1 ft, 2 ft, 3 ft, or 5 ft outside the wellbore into the formation.

According to some embodiments, the method includes isolating a treatment zone of the subterranean formation before contacting sand particles in the subterranean formation with one or more preflush solutions. Isolation of the treatment zone may be accomplished by cementing, packing, insertion of composite plugs, application of epoxy or other harden-able materials. Isolation of the treatment zone may be achieved by placing fluids of relatively greater or lesser density, above or below the treatment zone respectively. These fluids may serve to prevent resin from reaching the zones above or below the treatment zone. The treatment zone may be isolated from the rest of the well above the treatment zone, below the treatment zone, or both. Isolation of the treatment zone may be performed before contacting sand particles with a treatment fluid.

According to some embodiments, the method may include contacting sand particles in the subterranean formation with one or more preflush solutions before contacting sand particles in the subterranean formation with the treatment fluid. Generally, both phase separation and overflush systems may utilize a preflush to remove reservoir fluids and prevent incompatible materials from contacting one another. The preflush may include multiple preflush stages. According to some embodiments, a first preflush stage may include diesel oil and may contact the sand particles. Generally, the first preflush stage may serve to displace the reservoir oil. According to some embodiments, a further preflush stage (such as a second stage) may be introduced to remove formation water. For example, a second preflush stage including isopropyl alcohol may be contacted with the sand particles.

According to some embodiments, a final preflush stage may include contacting a spacer fluid with the sand particles. The final preflush stage may be performed before contacting sand particles in the subterranean formation with one or more preflush solutions. The final preflush stage including the spacer may be intended to prevent the resin from contacting other fluids, such as the isopropyl alcohol or reservoir fluids. The spacer fluid may be an aqueous solution, such as a brine. A brine may be an aqueous solution which includes at least 3 wt. %, 5 wt. %, 8 wt. %, 10 wt. %, 15 wt. %, 20 wt. %, 25 wt. %, or even 30 wt. % salt. The salt may include sodium chloride, potassium chloride, calcium chloride, or combinations thereof.

According to some embodiments, the method further includes performing a step rate test (SRT) on the subterranean formation after isolating the treatment zone. Generally, SRT is a method used to determine the maximum safe injection pressure without fracturing the reservoir rock. The SRT may be performed according to the United States Environmental Protection Agency "Step-Rate Test Procedure" published Jan. 12, 1999.

According to some embodiments, the method may further include contacting the consolidated sands with an overflush fluid after contacting sand particles in the subterranean formation with the treatment fluid. Generally, compared to phase separation systems, overflush systems may contain a percentage of active resin. When first injected, the pore spaces may be completely filled with resin, and an overflush may be required to push the excess resin away from the wellbore area to re-establish permeability. Only a residual amount of resin saturation, which may be concentrated at the sand contact points, may remain following the overflush. In embodiments where an overflush fluid is used, the treatment fluid may include from 15 to 99 wt. %, from 20 to 90 wt. %, from 30 to 90 wt. %, from 40 to 90 wt. % from 50 to 90 wt. %, from 60 to 90 wt. %, from 70 to 90 wt. %, from 20 to 80 wt. %, from 30 to 80 wt. % from 40 to 80 wt. %, from 50 to 80 wt. % or any combination thereof, of the multicomponent epoxy. According to some embodiments, the overflush fluid may be an aqueous solution or a non-aqueous solution. According to further embodiments, the overflush fluid may include an amine hardening agent, or any other resin curing agent. According to yet further embodiments, the overflush fluid may be the same solution as the preflush fluid. It should be understood that the overflush fluid may be contacted with the coated sand after the contacting of the treatment fluid with the sand particles or the overflush fluid may be contacted with the consolidated sands after contacting of the coated sand with the amine hardening agent.

According to some embodiments, the method may further include pumping a final displacement fluid into the subterranean formation after contacting sand particles in the subterranean formation with the treatment fluid. The final displacement fluid may include an oil based mud or a water based mud. For example, the final displacement fluid may include water, polymer clay, salt, weighting agents, rheology modifiers, viscoelastic fluids, barite, calcium carbonate, tannic acid, polyanionic cellulose, deflocculants, guar gum, xanthan gum, glycol, carboxymethylcellulose, starch, lignosulfates, polyphosphates, and oils.

According to some embodiments, the method may further include waiting a shut-in period after contacting sand particles in the subterranean formation with the treatment fluid, before returning the well to service. A well which is shut-in may refer to a well which is not producing or is producing at reduced rates relative to the rate at which it could be producing. The shut-in period may be greater than 0.5 hours (hrs.). For example, the shut-in period may be greater than 0.5 hrs., greater than 1 hr., greater than 2 hrs., greater than 4 hrs., greater than 6 hrs., greater than 8 hrs., greater than 10 hrs., greater than 15 hrs., even greater than 20 hrs., greater than 25 hrs., greater than 30 hrs., greater than 35 hrs., or even greater than 40 hr. The shut-in period may be from 0.5 hrs. to 48 hr. For example, the shut-in period may be from 0.5 hrs. to 40 hrs., from 0.5 hrs. to 30 hrs., from 0.5 hrs. to 20 hrs., from 0.5 hrs. to 10 hrs., from 0.5 hrs. to 5 hrs., from 0.5 hrs. to 2 hrs., from 1 hr. to 2 hrs., from 1 hr. to 4 hrs., from 1 hr. to 8 hrs., from 1 hr. to 16 hrs., from 1 hr. to 32 hrs., from 1 hr. to 48 hrs., from 2 hrs. to 4 hrs., from 2 hrs. to 8 hrs., from 2 hrs. to 16 hrs., from 2 hrs. to 32 hrs., from 2 hrs. to 48 hrs., from 4 hrs. to 8 hrs., from 4 hrs. to 16 hrs., from 4 hrs. to 32 hrs., from 4 hrs. to 48 hrs., from 8 hrs. to 16 hrs., from 8 hrs. to 32 hrs., from 8 hrs. to 48 hrs., from 16 hrs. to 32 hrs., from 16 hrs. to 48 hrs., or from 24 hrs. to 48 hrs., or any combination thereof.

According to some embodiments, the treatment fluid may include a multicomponent epoxy and a base fluid. The treatment fluid may include greater than 10 wt. %, 20 wt. %, 30 wt. %, 40 wt. %, 50 wt. %, 60 wt. %, 70 wt. %, 80 wt. %, or 90 wt. % of the base fluid. The treatment fluid may include less than 60 wt. %, 50 wt. %, 40 wt. %, 30 wt. %, 20 wt. %, 10 wt. %, 5 wt. %, 1 wt. %, or 0.1 wt. % of the base fluid.

EXAMPLES

Using the embodiments of the present disclosure, treatment fluids were produced which exemplify the attributes presently described. It should be understood that the ensuing Examples are illustrative of one or more embodiments presently disclosed, and should not be construed as in any way as limiting on the appended claims or other portions of the present application.

Example 1

In a first example, 80 grams of a Bisphenol-A diglycidyl ether (also referred to in this disclosure as "Razeen LR 2254") was mixed with 20 grams of C12-C14 alkyl glycidyl ether (also referred to in this disclosure as "Razeen D7106") and 4.6 grams of Diethylenetriamine (also referred to in this disclosure as "DETA" and "Razeencure 931") at 75° F. The mixture was then tested in a Brookfield Fann 35 viscometer. The rheological results of Example 1 are given in Table 1. The multicomponent epoxy was then mixed with 100 g of 20/40 sand at a temperature of 140° F., after 2 hours it was observed to have formed a composite solid.

TABLE 1

| Shear Speed | Viscosity (cP) |
| --- | --- |
| 300 RPM | 164 |
| 200 RPM | 111 |
| 100 RPM | 56 |
| 6 RPM | 3 |
| 3 RPM | 1 |

Example 2

In a comparative example, 160.43 grams of a WellLock™ R1 epoxy resin comprising a butyl glycidyl ether was mixed with 53.1 grams of WellLock™ R2 epoxy resin comprising a cyclohexanedimethanol diglycidyl ether and 61.77 grams of WellLock™ H1 curing agent comprising diethyltoluenediamine at 75° F. All three of the WellLock™ epoxy components were sold by Halliburton Energy Services, Inc. The mixture was tested in a Brookfield Fann 35 viscometer. The rheological results of Example 2 are given in Table 2.

It should be noted that the 300 RPM case could not be examined as the viscometer was only capable of returning results up to 300 cP.

TABLE 2

| Shear Speed | Viscosity (cP) |
|---|---|
| 300 RPM | >300 |
| 200 RPM | 221 |
| 100 RPM | 124 |
| 6 RPM | 7 |
| 3 RPM | 4 |

The decreased viscosity shown in table 1 versus the comparative example shown in table 2 is believed to enable deeper penetration of the epoxy resin into the sand formation. This deeper penetration of the epoxy resin into the sand formation may enable easier consolidation of the sand formation.

Example 3

To investigate gelling time, various ratios of multicomponent epoxy and amine hardening agent were prepared at mixed under ambient conditions. The resultant gelling times are given in tables 3-6. As can be seen from the data, increased concentrations of curing agent result in shorter cure times.

TABLE 3

| Sample 1 | Formula (grams) | Gelling time |
|---|---|---|
| Razeen LR 2254 | 80 | 2.5 hours |
| Razeen D7106 | 20 | |
| Razeencure 931 | 4.6 | |

TABLE 4

| Sample 2 | Formula (grams) | Gelling time |
|---|---|---|
| Razeen LR 2254 | 80 | 3.5 hours |
| Razeen D7106 | 20 | |
| Razeencure 931 | 3.9 | |

TABLE 5

| Sample 3 | Formula (grams) | Gelling time |
|---|---|---|
| Razeen LR 2254 | 80 | 6 hours |
| Razeen D7106 | 20 | |
| Razeencure 931 | 2.6 | |

TABLE 6

| Sample 4 | Formula (grams) | Gelling time |
|---|---|---|
| Razeen LR 2254 | 80 | 13 hours |
| Razeen D7106 | 20 | |
| Razeencure 931 | 1.9 | |

Having described the subject matter of the present disclosure in detail and by reference to specific embodiments, it is noted that the various details disclosed in the present disclosure should not be taken to imply that these details relate to elements that are essential components of the various embodiments described in the present disclosure.

Further, it will be apparent that modifications and variations are possible without departing from the scope of the present disclosure, including, but not limited to, embodiments defined in the appended claims It is noted that one or more of the following claims utilize the term "where" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A method of consolidating sands in a subterranean formation penetrated by a wellbore, the method comprising:
   contacting sand particles in the subterranean formation with a treatment fluid to form coated sands; where the treatment fluid has a viscosity from 25 to 75 cP at 100 RPM and comprises a multicomponent epoxy, a base fluid, wherein the base fluid comprises water, and an amine hardening agent, the multicomponent epoxy comprising a di glycidyl ether resin and a monoglycidyl ether resin; and
   allowing the amine hardening agent to cure the multicomponent epoxy and form the consolidated sands.

2. The method of claim 1, in which the diglycidyl ether resin comprises a Bisphenol-A diglycidyl ether or a 1,6-hexanediol diglycidyl ether.

3. The method of claim 1, in which the monoglycidyl ether resin comprises 2,3-epoxypropyl-o-tolyl ether.

4. The method of claim 1, in which the monoglycidyl ether comprises a C12-C14 alkyl glycidyl ether resin.

5. The method of claim 1, in which the amine hardening agent comprises diethylenetriamine (DETA), triethylenetetramine (TETA), isophoronediamine (IPDA), tetraethylenepentamine (TEPA), or a combination of these.

6. The method of claim 1, in which the method further comprises contacting sand particles in the subterranean formation with one or more preflush solutions before contacting sand particles in the subterranean formation with the treatment fluid.

7. The method of claim 6, in which at least one of the preflush solution is aqueous.

8. The method of claim 6, in which the method further comprises contacting the consolidated sands with an overflush fluid and the overflush fluid is the same as the preflush fluid.

9. The method of claim 1, in which the method further comprises isolating a treatment zone of the subterranean formation before contacting sand particles in the subterranean formation with one or more preflush solutions.

10. The method of claim 1, in which the method further comprises displacing at least some liquid with in the oil bearing formation with brine before contacting sand particles in the subterranean formation with the treatment fluid.

11. The method of claim 1, in which the method further comprises performing a step rate test on the oil bearing formation after isolating the treatment zone.

12. The method of claim 1, in which the method further comprises contacting the consolidated sands with an overflush fluid after contacting sand particles in the subterranean formation with the treatment fluid.

13. The method of claim 12, in which the overflush fluid is aqueous or nonaqueous.

14. The method of claim 1, in which the method further comprises pumping a final displacement fluid into the subterranean formation after contacting sand particles in the subterranean formation with the treatment fluid.

15. The method of claim 1, in which the method further comprises waiting a shut-in period after contacting sand particles in the subterranean formation with the treatment fluid, before returning the well to service.

16. The method of claim 1, in which the treatment fluid penetrates at least 1 ft outside the wellbore into the formation.

17. The method of claim 1, in which the treatment fluid comprises from 5 to 95 weight percent (wt. %) of the multicomponent epoxy when compared with the total weight of the treatment fluid.

18. The method of claim 1, in which a weight ratio of diglycidyl ether resin:monoglycidyl ether resin in the multicomponent epoxy is from 1:100 to 99:1.

19. The method of claim 1, in which a weight ratio of multicomponent epoxy:amine hardening agent is from 4:1 to 99:1.

20. The method of claim 1, in which the subterranean formation contains less than or equal to 10 wt. % clay.

* * * * *